United States Patent
Hugel

(10) Patent No.: US 10,168,241 B2
(45) Date of Patent: Jan. 1, 2019

(54) DRYING MODULE FOR A RELATIVE PRESSURE MEASURING TRANSDUCER

(71) Applicant: Endress + Hauser GmbH + Co. KG, Maulburg (DE)

(72) Inventor: Michael Hugel, Lorrach (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 165 days.

(21) Appl. No.: 15/320,393

(22) PCT Filed: Jun. 8, 2015

(86) PCT No.: PCT/EP2015/062680
§ 371 (c)(1),
(2) Date: Dec. 20, 2016

(87) PCT Pub. No.: WO2015/197345
PCT Pub. Date: Dec. 30, 2015

(65) Prior Publication Data
US 2017/0160160 A1 Jun. 8, 2017

(30) Foreign Application Priority Data
Jun. 24, 2014 (DE) ..................... 10 2014 108 780.1

(51) Int. Cl.
*G01L 7/00* (2006.01)
*G01L 9/00* (2006.01)
(Continued)

(52) U.S. Cl.
CPC .......... *G01L 19/0654* (2013.01); *G01L 13/02* (2013.01); *G01L 19/003* (2013.01); *G01L 19/144* (2013.01)

(58) Field of Classification Search
CPC ... G01L 7/00; G01L 9/00; G01L 13/02; G01L 19/00; G01L 19/003; G01L 19/06; G01L 19/0654; G01L 19/14; G01L 19/144
See application file for complete search history.

(56) References Cited

U.S. PATENT DOCUMENTS

| 8,763,466 B2 | 7/2014 | Wosnitza et al. |
| 9,239,251 B2 | 1/2016 | Lopatin et al. |

(Continued)

FOREIGN PATENT DOCUMENTS

| CN | 1653327 A | 8/2005 |
| CN | 1768256 A | 5/2006 |

(Continued)

OTHER PUBLICATIONS

German Search Report, German Patent Office, Munich, DE, dated Sep. 10, 2014.

(Continued)

*Primary Examiner* — Nguyen Ha
(74) *Attorney, Agent, or Firm* — Bacon & Thomas, PLLC

(57) ABSTRACT

A drying module for a relative pressure measuring transducer, which has in the interior of a housing of the measuring transducer a reference pressure supply leading from a relative pressure sensor to an opening in a housing wall of the housing, and which has a connection element, whose inner space is connected via the opening with the reference pressure supply extending in the measuring transducer. The drying module comprises a module housing, which has an inner space, in which a drying means is located, and, extending through the module housing (23), a reference pressure supply, whose first end is contactable with the reference pressure via an opening of the module housing, whose second end is connectable to the reference pressure supply of the measuring transducer via a connection element of the drying module connectable with the connection (Continued)

element of the measuring transducer, and whose inner space in the module housing is in humidity permeable connection with the inner space containing the drying means.

15 Claims, 4 Drawing Sheets

(51) Int. Cl.
*G01L 13/02* (2006.01)
*G01L 19/06* (2006.01)
*G01L 19/14* (2006.01)
*G01L 19/00* (2006.01)

(56) References Cited

U.S. PATENT DOCUMENTS

2013/0230813 A1* 9/2013 McBrien ............... G05D 23/08
432/1
2015/0292973 A1* 10/2015 Ding ..................... G01L 9/0054
73/706

FOREIGN PATENT DOCUMENTS

| CN | 102834715 A | 12/2012 | |
|---|---|---|---|
| DE | 2901636 A1 * | 7/1980 | ........... G01L 9/0041 |
| DE | 10122511 A1 | 11/2002 | |
| DE | 102010003709 A1 | 10/2011 | |
| DE | 102010038986 A1 | 2/2012 | |
| DE | 102011082624 A1 | 3/2013 | |
| DE | 102014108780 A1 | 12/2015 | |
| EP | 1070948 A1 | 1/2001 | |
| JP | H04349919 | 12/1992 | |
| JP | 2002 206979 A | 7/2002 | |
| JP | 2002206979 A | 7/2002 | |
| JP | 2006052997 A * | 2/2006 | ............... G01L 9/00 |
| WO | 2011124418 A1 | 10/2011 | |

OTHER PUBLICATIONS

International Search Report, EPO, The Netherlands, dated Aug. 4, 2015.
English Translation of the International Preliminary Report on Patentability, WIPO, Geneva, CH, dated Jan. 5, 2017.
Office Action dated Aug. 8, 2018, in corresponding Chinese Application No. 2015-80033755.4.

* cited by examiner

DRYING MODULE FOR A RELATIVE PRESSURE MEASURING TRANSDUCER

TECHNICAL FIELD

The invention relates to a drying module for a measuring transducer for metrological registering of a pressure to be measured as a relative pressure relative to a reference pressure reigning in the environment of the measuring transducer. In the interior of a housing of the measuring transducer, a reference pressure supply leads from a relative pressure sensor to an opening in a housing wall of the housing. The invention relates additionally to a relative pressure measuring transducer having a drying module.

BACKGROUND DISCUSSION

Relative pressure measuring transducers are applied for registering relative pressures in many fields of industrial measurements technology.

In such case, the reference pressure is, as a rule, an ambient pressure in the environment of the measuring transducer. In the case of the most applications, this is the atmospheric pressure at the location of use. If, however, the measuring transducer is applied e.g. in a space under positive- or negative pressure, then the reference pressure is, for example, the internal pressure of the space.

Relative pressure measuring transducers contain a relative pressure sensor, which is arranged in a housing and supplied with both the pressure to be measured as well as also the reference pressure.

Relative pressure sensors usually comprise a pressure measuring chamber sealed by a pressure sensitive element, especially a measuring membrane. In measurement operation, the outside of the pressure sensitive element is supplied with the pressure to be measured, while its inner side is supplied with the reference pressure via a reference pressure supply communicating with the pressure measuring chamber. The resulting deflection of the pressure sensitive element dependent on the relative pressure is registered by means of an electromechanical transducer and converted into an electrical signal dependent on the relative pressure. The electrical signal is then available for additional processing and/or evaluation.

A disadvantage of such measuring transducers is that a connection to the environment is present via the reference pressure supply, so that moisture from the environment can get into the measuring transducer, especially into the relative pressure sensor.

In such case, the moisture gets into the measuring transducer via the air volume exchanged with the environment in the case of pressure transfer via the reference pressure supply. If the temperature in the environment of the measuring transducer is higher than the temperature in the interior of the measuring transducer, then the dew point can be subceeded in the interior of the measuring transducer, and condensate forms.

If moisture gets into the interior of the reference pressure sensor or in contact with the electromechanical transducer, then this can lead to significant degrading of the accuracy of measurement and in the extreme case even to the complete failure of the measuring transducer.

This problem can be defended against, on the one hand, by trying to avoid penetration of moisture into the measuring transducer. To this end, European patent, EP 1 070 948 A1 describes using a hydrophobic filter in the opening of the measuring transducer, with which the reference pressure supply communicates. The filter does indeed have some effect in protecting the inner space against moisture. However, penetration of moisture cannot be completely suppressed, due to the required air permeability. Especially when the measuring transducer is exposed to a hot environment with high humidity, humid air gets into the housing, so that upon a later cooling a residual moisture remains in the housing.

For solution of this problem, German patent, DE 10 2010 003 709 A1 describes a measuring transducer, in whose housing a drying chamber is arranged for collecting moisture, which has penetrated into the housing. For this, the drying chamber contains a moisture adsorbing material, or is composed essentially of a moisture adsorbing material. In the case of the described measurement transducer, at least one section of the inner space of the reference pressure supply extending in the interior of the housing is in humidity permeable connection with the moisture adsorbing material of the drying chamber. The reference pressure supply is embodied for this e.g. as a line, which has a line interruption, an opening or a humidity permeable wall, via which moisture can escape from its inner space. This moisture is then absorbed by the moisture adsorbing material of the drying chamber, which can be arranged directly bordering the line interruption, the opening or the humidity permeable wall or separated therefrom by a hollow space and/or a humidity permeable wall.

The drying chamber can only collect a limited amount of moisture, and is, consequently, preferably embodied as a replaceable module.

Since the drying chamber serves to collect moisture, which has already penetrated into the interior of the housing of the measuring transducer, it is arranged in the interior of the measuring transducer. It is, consequently, absolutely necessary to open the housing of the measuring transducer in the case of each replacement. That necessarily means an interruption of measurement operation. Moreover, in the case of opened housing, the entire interior of the housing is exposed to the surrounding air, so that in the case of a replacement in an environment with high humidity very rapidly very much moisture can penetrate into the housing, which must subsequently be collected by the newly installed drying chamber.

Moreover, the drying chamber requires space within the housing. Larger housings mean, however, greater quantities of air, and therewith, also more moisture. Moreover, the space requirement of the drying chamber is, in given cases, counter to a desired miniaturizing of the transducer housing, and a retrofitting of already existing measuring transducers with a drying chamber is usually not possible for reasons of space.

SUMMARY OF THE INVENTION

It is an object of the invention to provide a drying module for a relative pressure measuring transducer, as well as a relative pressure measuring transducer equippable therewith, for overcoming the aforementioned problems.

For this, the invention resides in a drying module for a measuring transducer for metrological registering of a pressure to be measured as a relative pressure relative to a reference pressure reigning in the environment of the measuring transducer, which has in the interior of a housing of the measuring transducer a reference pressure supply leading from a relative pressure sensor to an opening in a housing wall of the housing, and which has a connection element, whose inner space is connected via the opening with the reference pressure supply extending in the measuring transducer, which drying module comprises a module housing, which has an inner space, in which a drying means, especially a moisture adsorbing material, is located, and a reference pressure supply extending through the module housing, whose first end is contactable with the reference pressure via an opening of the module housing, whose second end is connectable to the reference pressure supply of the measuring transducer via a connection element of the drying module connectable with the connection element of the measuring transducer, and whose inner space in the module housing is in humidity permeable connection with the inner space containing the drying means.

A first variant of the invention resides in a drying module of the invention, wherein the reference pressure supply extending through the module housing is embodied as a line, especially a capillary line, and the humidity permeable connection occurs via at least one line interruption, at least one opening in a line wall of the line, and/or at least one humidity permeable wall region of the line.

A second variant of the invention resides in a drying module of the invention, wherein the reference pressure supply extending through the module housing comprises a line, especially a capillary line, having a humidity impermeable wall, and the humidity permeable connection of the inner space of the reference pressure supply with the inner space containing the drying means occurs via an open end of the line facing toward the connection element connectable with the connection element of the measuring transducer.

In a first embodiment of the second variant, there is provided adjoining the open end of the line a hollow space, which communicates with an inner space of the module housing externally surrounding the line.

In a second embodiment of the second variant, the line is a capillary line, which comprises a small tube, especially a metal small tube, into which at least one further small tube of a synthetic material, especially tetrafluoroethylene-perfluoro(methyl vinyl ether) (MFA) or perfloroalkoxy alkane (PFA) copolymer, is inserted.

A first further development of the invention resides in a drying module of the invention, wherein the inner space of the reference pressure supply is separated from the inner space of the module housing containing the drying means by a humidity permeable membrane, especially a humidity permeable and moisture collecting membrane, and the humidity permeable connection passes via the membrane.

A further development of the first further development resides in a drying module, wherein the reference pressure supply is embodied as a line, or includes a line, and between the membrane and the line a gap is provided, especially a gap cylindrical surrounding the line, especially a gap with a gap width in the order of magnitude of one tenth or a few tenths of a millimeter.

In an additional further development of the first further development, the membrane is a body, especially an essentially cylindrical body, which has on its ends, in each case, a stiffening, especially a stiffening inserted into a cavity in the module housing, and the stiffenings have longitudinally connecting webs, between which thin-walled membrane regions are enclosed.

In a preferred embodiment of the first further development, the membrane is composed of silicone, silicone rubber, polyvinyl chloride (PVC), polytetrafluoroethylene (PTFE), polyamide or polyimide.

In an additional preferred embodiment of the first further development, the inner space of the module housing containing the drying means is closed off from the environment of the drying module by a module housing wall and from the remaining inner space of the module housing by the humidity permeable membrane.

In a preferred embodiment, the drying means is arranged in an inner space of the module housing externally surrounding the reference pressure supply extending through the module housing.

In an additional preferred embodiment, the drying means is a moisture adsorbing material, especially zeolite or silica gel, which is introduced into the module housing (23) especially as granular material or gel, especially as granular material or gel surrounded by a moisture permeable wall, especially a wall of silicone, silicone rubber, polyvinyl chloride (PVC), polytetrafluoroethylene (PTFE), polyamide or polyimide, or as a solid body, especially as a sintered body of zeolite or as a composite body manufactured of a moisture adsorbing material, especially zeolite- or silica gel powder, and a polymer.

In an additional further development of the invention, a filter of a water repelling, especially water impermeable, gas permeable material, through which the reference pressure is transmitted, especially a filter arranged under a cap having at least one pressure equalizing opening, especially a pressure equalizing opening arranged offset from the end of the reference pressure supply, is placed in front of the end of the reference pressure supply leading through the module housing and contactable with the reference pressure.

Additionally, the invention resides in a method for manufacturing a drying module according to the first variant and the first further development, wherein the line is inserted, especially pressed or adhered, into a connection socket of a cap of the module housing the membrane is pushed onto the line, and the unit prefabricated in this way is inserted, with the line leading, into the module housing equipped with the drying means, wherein the connection socket is connected with a securement feature provided on the module housing.

Additionally, the invention resides in a measuring transducer for metrological registering of a pressure to be measured as a relative pressure relative to a reference pressure reigning in the environment of the measuring transducer, comprising a reference pressure supply leading in the interior of a housing of the measuring transducer from a relative pressure sensor to an opening in a housing wall of the housing, and a connection element provided on the housing wall, in front of whose reference pressure supply is placed a drying module of the invention releasably connected with the connection element.

The drying module of the invention has the advantage that it is connectable via its connection element located outside of the housing of the measuring transducer to the reference pressure supply extending in the interior of the housing. This offers the advantage that the drying module withdraws the air moisture penetrating into the housing, before it gets at all into the measuring transducer. In this way, besides the relative pressure sensor, also other components contained in the housing are protected against moisture.

A further advantage is that due to its position outside of the housing, it can be replaced at any time, without problem, and, above all, without that the measuring transducer must be opened. Since the replacement in no manner degrades the functional ability of the measurement transmitter, an interruption of measurement operation is not required for such.

Since the drying module requires no space in the interior of the measuring transducer, also existing measurement transducers can be retrofitted with a drying module of the invention. For this, there must be provided only on the outside of the measurement transducer, in the region, in which the reference pressure supply extending in the interior of the housing has its entrance, a connection element connectable with the connection element of the drying module.

Moreover, the preferred form of embodiment, in the case of which the reference pressure supply includes within the drying module a humidity impermeable capillary line, and the humidity permeable connection occurs via its end facing the measurement transducer, offers the advantage that the capillary line acts over its total length as a diffusion barrier to penetrating moisture, and, thus, counteracts a penetration of moisture. In this way, it is achieved that the drying module can be applied over a clearly longer time span, before a saturation of the humidity adsorbing material occurs to make necessary a replacement of the drying module.

BRIEF DESCRIPTION OF THE DRAWINGS

The invention and its advantages will now be explained in greater detail based on the figures of the drawing, in which two examples of embodiments are shown. Equal elements are provided in the figures with equal reference characters. The figures of the drawing show as follows.

DETAILED DISCUSSION IN CONJUNCTION WITH THE DRAWINGS

Figure 1:
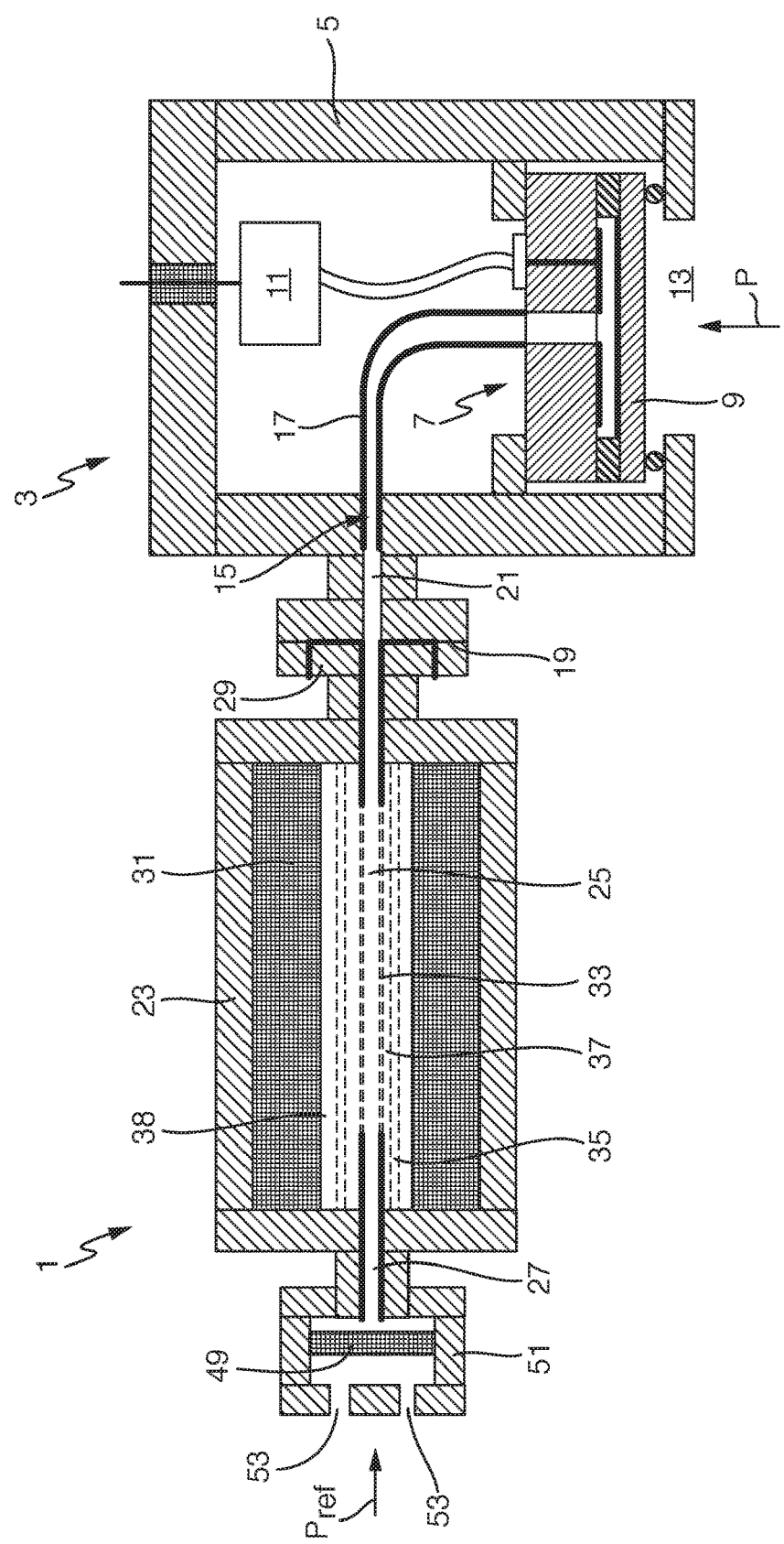
FIG. 1 is a schematic drawing of the principles of a relative pressure measuring transducer equipped with a first variant of a drying module of the invention.

FIG. 1 shows a schematic drawing (not to scale) of the principles of a relative pressure measuring transducer 3 equipped with a drying module of the invention 1 and serving for metrological registering of a pressure p to be measured as a relative pressure $p_R$ relative to a reference pressure $p_{ref}$ reigning in the environment of the measuring transducer.

In the case of most applications, the reference pressure $p_{ref}$ is the atmospheric pressure at the location of use. If the measuring transducer 3 is applied, however, e.g. in a space under positive- or negative pressure, then the reference pressure $p_{ref}$ is, for example, the internal pressure of the space.

Measuring transducer 3 includes a housing 5, in which a relative pressure sensor 7 is arranged. The relative pressure sensor 7 includes a pressure sensitive element 9, especially a measuring membrane, whose first side is supplied in measurement operation with the pressure p to be measured and whose second side is supplied in measurement operation with the reference pressure $p_{ref}$. A pressure difference applied across the pressure-sensitive element 9 between the pressure p to be measured and the reference pressure $p_{ref}$ effects a deflection of the pressure sensitive element 9 dependent on the relative pressure $p_R$ metrologically to be registered. The deflection is registered by means of an electromechanical transducer and converted into an electrical output signal dependent on the relative pressure $p_R$ to be measured. This output signal is then available for further processing and/or evaluation, performed, for example, by a measuring device electronics 11 arranged in the housing 5 and connected to the transducer.

Suited for service as relative pressure sensors are, for example, semiconductor sensors, such as e.g. silicon chips, having a pressure sensitive membrane applied on a platform and containing doped piezo-resistive resistance elements, which are, for example, connected together to form a measuring-bridge circuit, or capacitive, ceramic, relative pressure measuring cells, which have at least one capacitor with a capacitance dependent on the pressure dependent deflection of the measuring membrane. Alternatively, however, also other types of relative pressure sensors can be applied.

Depending on type of relative pressure sensor 7 used, the pressure loading of the pressure sensitive element 9 can occur directly, such as shown here using the example of a capacitive, ceramic, relative pressure measuring cell, through an opening 13 of the housing 5 exposing the pressure-sensitive element 9. Alternatively, the pressure loading can occur via a pressure transfer means connected in front of the relative pressure sensor 7. The pressure transfer means includes, for example, a pressure receiving chamber closed outwardly by an isolating diaphragm. The pressure receiving chamber is connected via a pressure transfer line with a measuring chamber, in which the first side of the pressure sensitive element 9 is exposed to the pressure reigning in the measuring chamber. The pressure p to be measured is fed directly or via a process connection to the outside of the isolating diaphragm, and transmitted via the isolating diaphragm and a pressure transferring liquid into the measuring chamber, where it then acts on the pressure-sensitive element 9 of the relative pressure sensor 3.

Measuring transducer 3 includes within the housing 5 a reference pressure supply 17 extending from the relative pressure sensor 7 to an opening 15 in a housing wall of the housing 5. The reference pressure supply 17 comprises, for example, a pressure transferring line, especially a capillary line, which transmits the reference pressure $p_{ref}$ supplied externally of the opening 15 to the inner side of the pressure sensitive element 9. A pressure transferring line is, however, not absolutely required. Fundamentally, it suffices to have the reference pressure $p_{ref}$ supplied via the opening 15 act, via corresponding hollow spaces forming the reference pressure supply 17 in the housing 5, on the inner side of the pressure sensitive element 9 to be loaded with the reference pressure $p_{ref}$.

Moreover, the relative pressure measuring transducer 3 includes provided on the housing wall a connection element 19, which has an inner space 21 connected via the opening 15 to the reference pressure supply 17 extending in the inner space of the housing 5.

The connection element 19 is either a connection element 19 already provided in the manufacture of the measuring transducer 3, or a retrofitted connection element 19, which is subsequently applied on the region of the housing wall surrounding the opening 15. With regard to metal housings 5, the retrofitting can occur e.g. by subsequent welding on of the connector element 19 manufactured for this and composed preferably likewise of metal. In the case of measuring transducers 3 manufactured with a mechanical securement apparatus for a replaceable insert connected in front of the opening 15 and containing a water impermeable filter or a water impermeable membrane, the securement apparatus can either be used directly as a connection element 19, or an appropriately embodied connection element can be engaged with this securement apparatus.

The drying module 1 of the invention is connected in front of the reference pressure supply 17 extending in the interior of the housing 5 of the measuring transducer 3. Drying module 1 includes a module housing 23 and a reference pressure supply 25 extending through the module housing 23. Reference pressure supply 25 includes a first end, which is contactable with the reference pressure $p_{ref}$ via an opening 27 of the module housing 23. A second end of the reference pressure supply 25 is connected to the reference pressure supply 17 of the measuring transducer 3 via a connection element 29 connected with the connection element 19 of the measuring transducer 3. Connection element 29 is provided on an end of the module housing 23 lying opposite the opening 27.

The connection of the two connection elements 19, 29 is a releasable, preferably gas-sealed, mechanical connection, such as e.g. a screwed connection embodied preferably with interpositioning of a seal exhibiting an as high as possible gas tightness.

Provided in the module housing 23 is an inner space, in which a drying means 31, especially a moisture adsorbing material, is located.

Drying means 31 is arranged in the inner space of the module housing 23 preferably in such a manner that it externally surrounds the reference pressure supply 25 extending through the module housing 23. Drying means 31 preferably externally surrounds the reference pressure supply 25 over almost the entire length of the reference pressure supply 25. Moreover, an inner space of the reference pressure supply 25 extending through the module housing 23 is in humidity permeable connection with the inner space containing the drying means 31.

Suited as drying means 31 are moisture adsorbing materials, such as, for example, zeolite or silica gel. Both materials offer the advantage that the moisture adsorbed by them can be largely driven off by heating, so that they are reusable. Drying means 31 can be introduced into the inner space as powder, as granular material, as gel or as a solid body. Solid bodies can be manufactured as molded parts. Corresponding molded parts can be produced e.g. as sinter bodies of zeolite. Alternatively used as molded parts can be composite bodies, i.e. two-phase, solid materials manufactured of a moisture adsorbing material, such as, for example, zeolite- or silica gel powder, and a polymer.

While a molded part can be applied directly in the module housing 23, drying means 31 provided as a powder, as a granular material or as a gel is, in contrast, preferably surround by a wall, preferably a form giving wall, which is, at least in portions, moisture permeable. The resulting wall-surrounded structure is what is inserted into the module housing 23. The wall for this is composed, as a whole, or at least in portions, of a humidity permeable material, such as e.g. silicone, silicone rubber, polyvinyl chloride (PVC), polytetrafluoroethylene (PTFE), polyamide or polyimide.

The humidity permeable connection can be effected, for example, in the ways described in the above mentioned DE 10 2010 003 709 A1 in connection with drying chambers arranged inside the housings of measuring transducers.

For this, the reference pressure supply 25 extending through the module housing 23 is, for example, embodied as a line, especially a capillary line, and the humidity permeable connection is effected via a line interruption, via at least one opening in a line wall of the line, or via at least one humidity permeable wall region of the line. These variants are shown schematically in FIG. 1 by a light gray wall section 33 of the reference pressure supply 25, which in the case of the first variant, the line interruption, is absent, which in the case of the second variant having at least one opening is composed of a humidity impermeable material and has at least one opening, and which in the case of the third variant having at least one humidity permeable wall region is composed, as a whole, or sectionally, of a humidity permeable material, e.g. of silicone, silicone rubber, polyvinyl chloride (PVC), polytetrafluoroethylene (PTFE), polyamide or polyimide. Alternatively, the wall section 33 can have combinations of these variants.

In the case of the first two variants, the humidity permeable connection is formed between the inner space of the reference pressure supply 25 and the inner space of the module housing 23 containing the drying means 31 exclusively by hollow spaces bordering one another, respectively transitioning into one another. preferably, the inner space of the reference pressure supply 25 extending through the module housing 23 is, however, separated from inner space of the module housing 23 containing the drying means 31 by a humidity permeable, preferably humidity permeable and moisture collecting, membrane 35. The membrane (35) is composed e.g. of silicone, silicone rubber, polyvinyl chloride (PVC), polytetrafluoroethylene (PTFE), polyamide or polyimide.

This membrane 35 is shown dashed in FIG. 1 as an advantageous, however, optional, supplemental element.

In order to keep the air volume exchanged via the drying module 1 in the case of changes of temperature and/or of the reference pressure $p_{ref}$ small, the membrane 35 surrounds the reference pressure supply 25 embodied as a line, preferably in such a manner that there exists between the membrane 35 and the line only a narrow gap 37, especially a gap with a gap width in the order of magnitude of one tenth or a few tenths of a millimeter, e.g. 2 tenths of a millimeter.

In the case of the third variant, the humidity permeable wall region of the line already performs the function of the membrane 35, so that an additional membrane 35 in the case of this variant is possible, however, not required.

The humidity permeable membrane 35 as well as the humidity permeable wall region of the line act especially in the case of high pressure fluctuations as a transfer resistance, and bring about, thus, a slowing of the air exchange between the two separated internal spaces through the membrane 35, respectively the humidity permeable wall region. A slowing of the air exchange lengthens the length of time, during which the drying module 1 can be applied, before a saturation of the drying means 31 with absorbed moisture arises to make a replacement of the drying module 1 necessary.

Preferably, membrane 35 and drying means 31 are positioned and formed in such a manner that they directly adjoin one another, e.g. in that the membrane is embodied as a wall at least sectionally bounding the drying means 31.

Depending on structure of membrane 35 and drying means 31, a hollow space 38 can exist between membrane 35 and drying means 31, through which the humidity transport from the membrane 35 to the drying means 31 occurs. In order to keep the air volume exchanged via the drying module 1 in the case of changes of temperature and/or the reference pressure $p_{ref}$, as well as keeping the constructed size of the drying module 1 as small as possible, this hollow space 38 is preferably as small as possible.

The drying module 1 of the invention has the advantage that it is placed in front of the reference pressure supply 17 extending in the interior of the housing 5 of the measuring transducer 3. This offers the advantage that the drying module 1 catches air moisture which would otherwise penetrate into the housing 5 of the measuring transducer 3. Moreover, the air quantity exchanged via the opening 15 of the housing 5 of the measuring transducer 3 is significantly reduced by the drying module 1 being connected in front. Thus, significantly less and drier air gets into the measuring transducer 3.

Moreover, the drying module 1 due to its position outside of the measuring transducer 3 can be replaced at any time without problem, and, above all, without having to open the housing 5. Since the replacement in no manner degrades the functional ability of the measuring transducer 3, an interruption of measurement operation is not required therefor.

Since the drying module 1 requires no space in the interior of the housing 5, also existing measurement transducers can be retrofitted with drying modules 1 in the above described manner.

Figure 2:
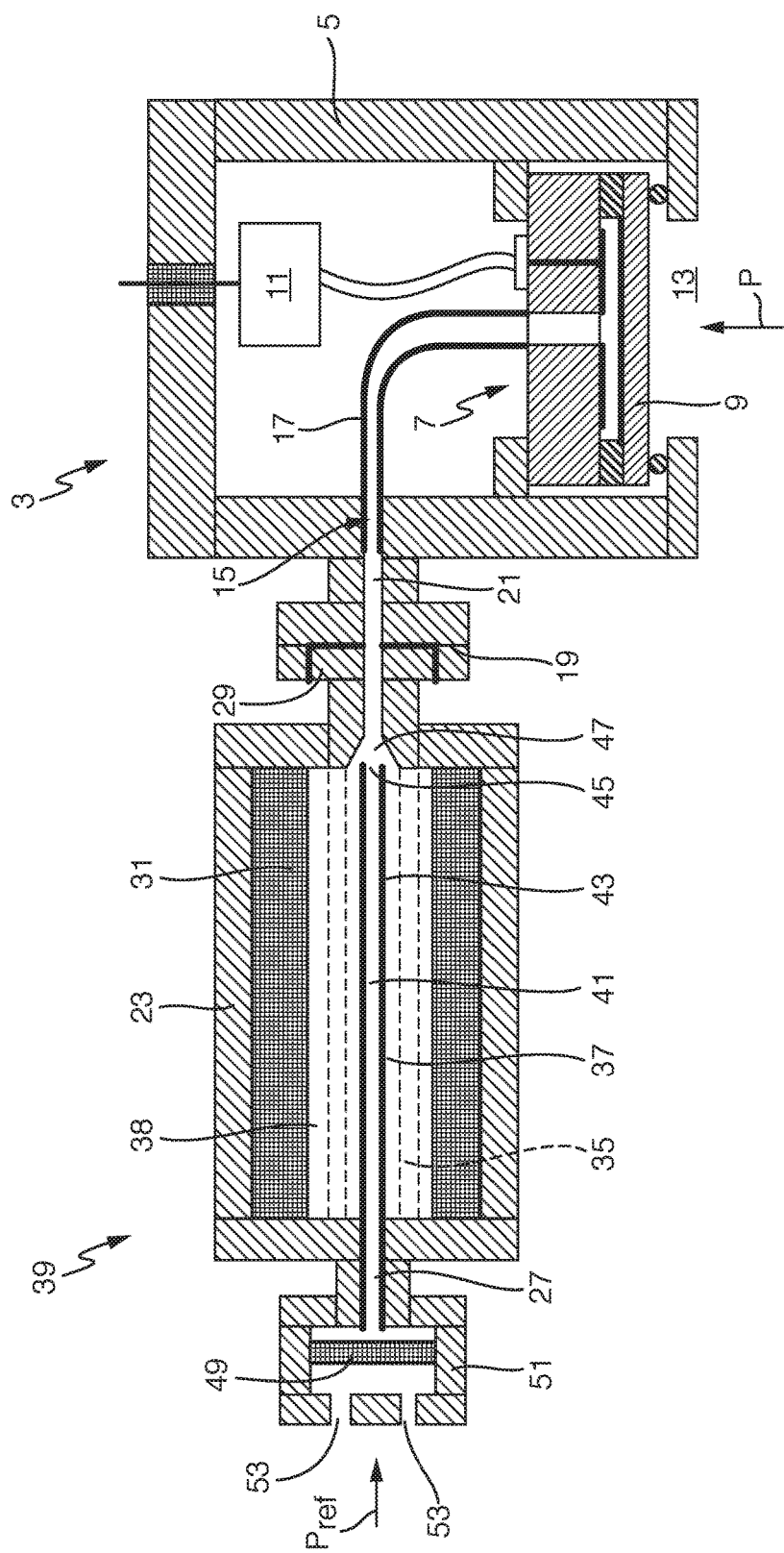
FIG. 2 is a schematic drawing of the principles of a relative pressure measuring transducer equipped with a second variant of a drying module of the invention.

FIG. 2 shows a further improvement of the invention in a schematic drawing (likewise not to scale) of the principles of a drying module 39. It differs from the drying module 1 illustrated in FIG. 1 as regards the reference pressure supply 41 extending through the drying module 39 and the humidity permeable connection between the inner space of the reference pressure supply 41 and the inner space of the module housing 23 containing the drying means 31. These differences will now be explained in detail. Otherwise, reference is made to the description of FIG. 1.

In contrast to the example of an embodiment illustrated in FIG. 1, the reference pressure supply 41 extending through the module housing 23 includes here a line 43, which has a humidity impermeable wall over its entire length. Line 43 is preferably a capillary line. Capillary lines have the advantage that due to their small inner diameter they act as a diffusion barrier against penetrating moisture. Suited as capillary lines are especially glass- or metal small tubes, or metal small tubes, into which, for additional reduction of the inner diameter, at least one additional small tube of a synthetic material, e.g. especially tetrafluoroethylene-perfluoro(methyl vinyl ether) (MFA) or perfloroalkoxy alkane (PFA) copolymer, is inserted.

A line 43 with a small inner diameter offers besides its effect as a diffusion barrier against moisture the advantage that it the transmits reference pressure $p_{ref}$ varying only slowly as a function of time almost unimpeded from the outside inwards, while it has a high transfer resistance to external, fast acting pressure changes, such as can occur, for example, in the case of a steam jet cleaning of the measuring transducer 3. A fast pressure rise effects, first of all, a compression of the air volume enclosed in the line 43. In this way, there arises a back pressure in the interior of the line 43, which acts against penetration of liquid, e.g. water. If the pressure outside sinks from where it was, then the air in the line 43 re-expands, and effects that, in given cases, liquid that penetrated in spite of the back pressure is pressed back out of the module housing 23. This holds correspondingly also for air that has, in given cases, penetrated into the line 43 due to very high pressure existing for a very short time. I.e., at least a part of the air pressed into the line 43 against the back pressure is ejected back out of the line 43.

In the case of the variant of the invention illustrated in FIG. 2, the humidity permeable connection of the inner space of the line 43 with the inner space containing the humidity adsorbing material 31 occurs through an open end 45 of the line 43 facing toward the connection element 29 connectable with the connection element 19 of the measuring transducer 3.

For this, there is provided before the open end 45 in the module housing 23 a preferably very small hollow space 47, especially a gap, which communicates with the inner space of the module housing 23 externally surrounding the line 43.

Also in the case of this variant of the invention, the inner space of the reference pressure supply 41 is preferably separated from the inner space of the module housing 23 containing the drying means 31 by the humidity permeable membrane 35. Also here the membrane 35 surrounds the line 41 preferably in such a manner that only a small gap exists between membrane 35 and line 43. In such case, the membrane 35 forms at the same time a humidity permeable bounding of the hollow space 47 arranged in front of the open end 45 of the line 41 from the inner space of the module housing 23 containing the drying means 31. Also here, membrane 35 and the drying means 31 bordering one another, such as already described in connection with FIG. 1, preferably directly border one another, respectively are separated from one another by an as small as possible hollow space 38 resulting from the structure of membrane 35 and drying means 31.

Preferably, the drying modules 1, 39 of the invention have a filter 49 connected in front of the reference pressure receiving end (i.e. the end to be loaded externally with the reference pressure $p_{ref}$) of the reference pressure supply 25, 41 leading through the module housing 23. Filter 49 is composed of a water repelling, preferably water impermeable, gas permeable material. Suited for this are hydrophobic or hydrophobized filters 49 of polytetrafluoroethylene, polyethersulfone, or a sintered metal, through which water cannot penetrate into the inner space of the reference pressure supply 25, 41, through which steam, however, can quite well escape from the inner space.

Filter 49 is arranged, for example, in a cap 51 mounted in front of the module housing 23 and covering the input opening of the reference pressure supply 25, 41. Cap 51 includes at least one pressure equalizing opening 53, which is preferably arranged offset from the input opening of the reference pressure supply 25, 41 and through which the reference pressure $p_{ref}$ is transmitted.

Cap 51 offers protection against direct water spray or water jets, to which the drying module 1, 39 is exposed in given cases. Filter 49 offers the advantage that it opposes fast pressure changes, arising e.g. in the course of a steam jet cleaning, with a high transfer resistance, while, in contrast, transmitting slow changes of the reference pressure $p_{ref}$ almost unimpeded.

Figure 3:
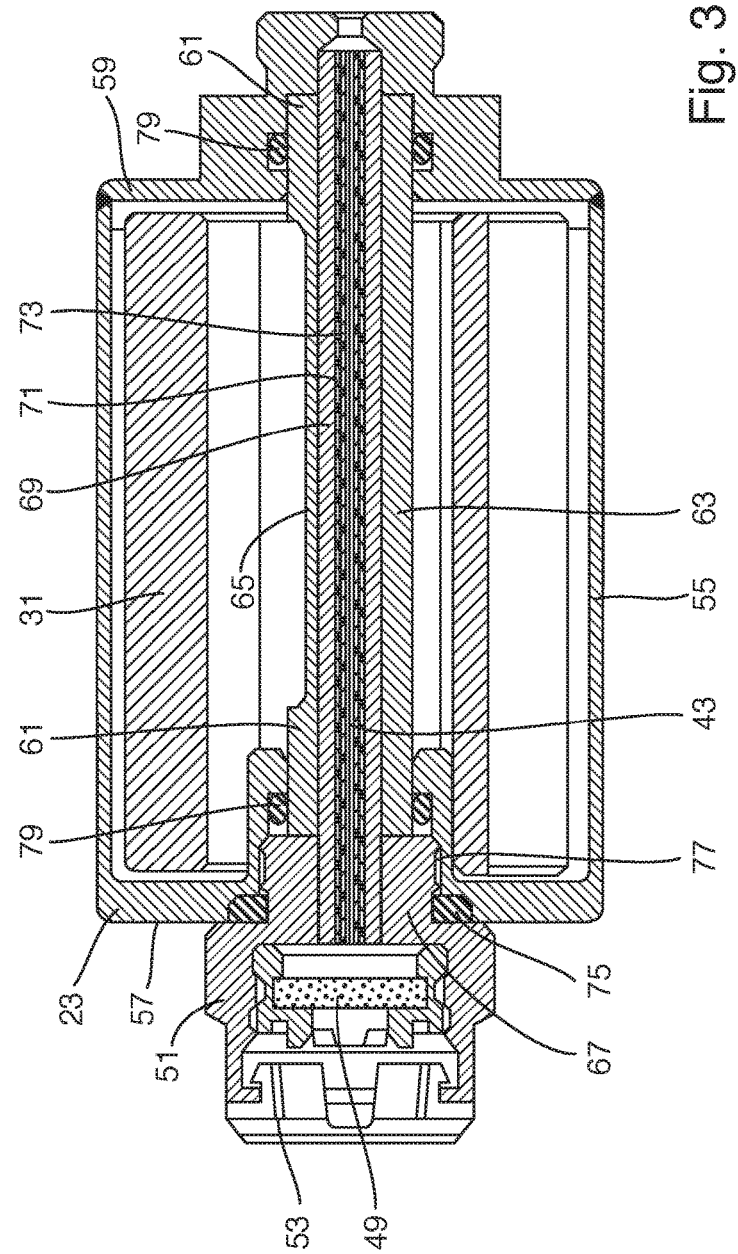
FIG. 3 is a structural embodiment of the drying module of FIG. 2.
Figure 4:
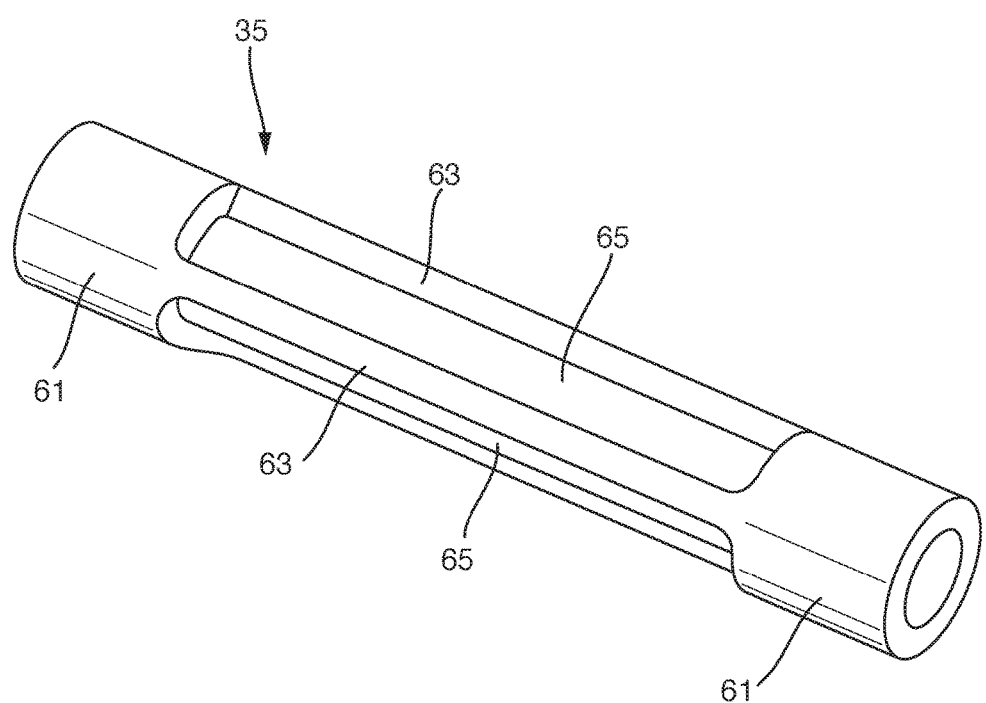
FIG. 4 is a view of the membrane of the drying module of FIG. 3.

FIG. 3 shows an example of a structural embodiment of the drying module 39 illustrated in FIG. 2 as a schematic drawing of the principles, and FIG. 4 shows a view of the membrane 35 of FIG. 3.

In the illustrated structural embodiment, the module housing 23 comprises an essentially cylindrical housing body 55, whose oppositely lying ends are each sealed by a cover 57, 59. For achieving an as small as possible structural shape and a high gas tightness, the module housing 23 is preferably welded. For this, the module housing 23 can have e.g. —such as shown here—sealed on one end by a floor forming the cover 57, an essentially cylindrical housing body 55, to whose end facing away from the floor the here essentially washer-shaped cover 59 is welded. Alternatively, an essentially cylindrical housing body can be applied, to whose two ends, in each case, an essentially washer-shaped cover is welded.

Alternatively, the covers can be embodied e.g. pot shaped, respectively lid shaped, and, preferably with interpositioning of a seal having an as high as possible gas tightness, be screwed onto, or into, the ends of the cylindrical housing body. Module housings manufactured in this way have, however, slightly greater external dimensions compared with the welded variant.

Membrane 35 is preferably formed as an essentially cylindrical body, which has on its two ends, in each case, a stiffening 61. The stiffenings 61 are e.g. cylindrical end regions of the membrane 35, where the membrane 35 has a greater wall thickness than in its remaining regions. Preferably, membrane 35 includes, supplementally to the terminal stiffenings 61, webs 63 of greater wall thickness connecting these stiffenings 61 in the longitudinal direction. Enclosed between webs 63 are thin-walled membrane regions 65. Webs 63 can—such as shown in FIGS. 3 and 4—extend in straight lines, or, however, be embodied as a grid connecting the stiffenings.

This structure effects a high form stability of the membrane 35 and facilitates its mounting. The mounting occurs, for example, by inserting, especially pressing or adhering, the line 43 into a connection socket 67 formed on the cap 51.

The line 43 shown in FIG. 3 is embodied as a capillary line, which comprises an external small tube 69, especially a metal small tube, into which are inserted, for additional reduction of the inner diameter, two other small tubes 71, 73, one placed in the other, and composed of a synthetic material, e.g. tetrafluoroethylene-perfluoro(methyl vinyl ether) (MFA) or perfloroalkoxy alkane (PFA) copolymer.

Then, the membrane 35 is pushed onto the line 43, and the unit, prefabricated in this way, with the line 43 leading, is inserted into the module housing 23 equipped with the drying means 31, whereupon the connection socket 67 is connected, with interpositioning of a preferably as gas tight as possible seal 75, into a correspondingly embodied securement feature 77, especially a screw thread, with the cover 57 of the module housing 23. In such case, the terminal stiffenings 61, preferably with interpositioning of as gas tight as possible seals 79, are introduced into correspondingly formed cavities in the module housing 23.

The invention claimed is:

1. A drying module for a measuring transducer for metrological registering of a pressure to be measured as a relative pressure relative to a reference pressure existing in the environment of the measuring transducer, comprising:
   a module housing, which has an inner space, in which a drying means, especially a moisture adsorbing material, is located;
   a first reference pressure supply extending through said module housing, having a first end contactable with the reference pressure via a first opening of said module housing, and having a second end connectable to a second reference pressure supply extending in the measuring transducer via a first connection element of the drying module connectable with a second connection element of the measuring transducer, and an inner space in the module housing in humidity permeable connection with said inner space containing said drying means, wherein:
   the second reference pressure supply extending in the measuring transducer leads from a relative pressure sensor to a second opening in a housing wall of a housing of the measuring transducer; and
   the second connection element has an inner space connected via the second opening with said second reference pressure supply extending in the measuring transducer.

2. The drying module as claimed in claim 1, wherein:
said first reference pressure supply extending through said module housing is embodied as a line, especially a capillary line; and
said humidity permeable connection occurs via at least one line interruption, at least one opening in a line wall of the line, and/or at least one humidity permeable wall region of the line.

3. The drying module as claimed in claim 1, wherein:
said first reference pressure supply extending through said module housing comprises a line, especially a capillary line, having a humidity impermeable wall; and
said humidity permeable connection with the inner space containing said drying means occurs via an open end of said line facing toward said first connection element connectable with said second connection element of said measuring transducer.

4. The drying module as claimed in claim 3, wherein:
there is provided adjoining said open end of said line a hollow space, which communicates with an inner space of said module housing externally surrounding said line.

5. The drying module as claimed in claim 3, wherein:
said line is a capillary line, which comprises a small tube, especially a metal small tube, into which at least one further small tube of a synthetic material, especially tetrafluoroethylene- perfluoro(methyl vinyl ether) (MFA) or perfloroalkoxy alkane (PFA) copolymer, is inserted.

6. The drying module as claimed in claim 1, wherein:
the inner space of said first reference pressure supply is separated from the inner space of said module housing containing said drying means by a humidity permeable, especially a humidity permeable and moisture collecting, membrane; and
the humidity permeable connection passes via said membrane.

7. The drying module as claimed in claim 6, wherein:
said first reference pressure supply is embodied as a line, or includes a line; and
between said membrane and said line a gap is provided, especially a gap cylindrical surrounding said line, especially a gap having a gap width in the order of magnitude of one tenth or a few tenths of a millimeter.

8. The drying module as claimed in claim 6, wherein:
said membrane is a body, especially an essentially cylindrical body, which has on its ends, in each case, a stiffening, especially a stiffening inserted into a cavity in said module housing; and
said stiffenings have longitudinally connecting webs, between which thin-walled membrane regions are enclosed.

9. The drying module as claimed in claim 6, wherein:
said membrane is composed of silicone, silicone rubber, polyvinyl chloride (PVC), polytetrafluoroethylene (PTFE), polyamide or polyimide.

10. The drying module as claimed in claim 6, wherein:
the inner space of said module housing containing said drying means is closed off from the environment of the drying module by a module housing wall and from the remaining inner space of said module housing by the humidity permeable membrane.

11. The drying module as claimed in claim 1, wherein:
said drying means is arranged in an inner space of said module housing externally surrounding said first reference pressure supply extending through said module housing.

12. The drying module as claimed in claim 1, wherein:
said drying means is a moisture adsorbing material, especially zeolite or silica gel, which is introduced into said module housing especially as granular material or gel, especially as granular material or gel surrounded by a moisture permeable wall, especially a wall of silicone, silicone rubber, polyvinyl chloride (PVC), polytetrafluoroethylene (PTFE), polyamide or polyimide, or as a solid body, especially as a sintered body of zeolite or as a composite body manufactured of a moisture adsorbing material, especially zeolite- or silica gel powder, and a polymer.

13. The drying module as claimed in claim 1, further comprising:
a filter of a water repelling, especially water impermeable, gas permeable material, through which the reference pressure is transmitted, especially a filter arranged under a cap having at least one pressure equalizing opening, especially a pressure equalizing opening arranged offset from the end of the first reference pressure supply, is placed in front of the first end of the first reference pressure supply extending through said module housing and contactable with the reference pressure.

14. A method for manufacturing a drying module comprising:
a drying module for a measuring transducer for metrological registering of a pressure to be measured as a relative pressure relative to a reference pressure existing in the environment of the measuring transducer, comprising:
a module housing, which has an inner space, in which a drying means, especially a moisture adsorbing material, is located;
a first reference pressure supply extending through said module housing, having a first end contactable with the reference pressure via a first opening of said module housing, and having a second end connectable to a second reference pressure supply extending in the measuring transducer via a first connection element of the drying module connectable with a second connection element of the measuring transducer, and an inner space in the module housing in humidity permeable connection with said inner space containing said drying means, wherein:
the second reference pressure supply extending in the measuring transducer leads from a relative pressure sensor to a second opening in a housing wall of a housing of the measuring transducer; and
a second connection element is provided, whose inner space is connected via the second opening with said second reference pressure supply extending in the measuring transducer;
comprising the steps of:
inserting a line, especially pressed or adhered, into a connection socket of a cap of the module housing;
pushing a membrane onto the line; and
inserting a unit comprising the line and the membrane, with the line leading, into the module housing equipped with the drying means, wherein:
a connection socket is connected with a securement feature provided on the module housing.

15. A measuring transducer for metrological registering of a pressure to be measured as a relative pressure relative to a reference pressure reigning in the environment of the measuring transducer, comprising:
a second reference pressure supply extending in an interior of a housing of the measuring transducer from a relative pressure sensor to a second opening in a housing wall of the housing; and
a second connection element provided on the housing wall of the housing, in front of the second reference pressure supply is placed a drying module releasably connected with the second connection element, said drying module comprising:
a drying module for a measuring transducer for metrological registering of a pressure to be measured as a relative pressure relative to a reference pressure existing in the environment of the measuring transducer, comprising:
a module housing, which has an inner space, in which a drying means, especially a moisture adsorbing material, is located;
a first reference pressure supply extending through said module housing, having a first end contactable with the reference pressure via a first opening of said module housing, and having a second end connectable to the second reference pressure supply via a first connection element of the drying module connectable with a the second connection element, and an inner space in the module housing in humidity permeable connection with said inner space containing said drying means, wherein: the second connection element has an inner space connected via the second opening with said second reference pressure supply extending in the measuring transducer.

* * * * *